United States Patent [19]

Murata et al.

[11] Patent Number: 4,688,772
[45] Date of Patent: Aug. 25, 1987

[54] APPARATUS FOR SEALING THE SKIRT OF A CONVERTER WASTE GAS RECOVERY SYSTEM

[75] Inventors: Toyo-o Murata, Kitakyushu; Hiroshi Narita, Sakai; Yukinori Shigeyama, Kitakyushu; Mazumi Nishikawa, Yokosuka, all of Japan

[73] Assignees: Nippon Steel Corporation, Tokyo; Kawasaki Jukogyo Kabushiki Kaisha, Kobe, both of Japan

[21] Appl. No.: 858,015

[22] Filed: May 1, 1986

[30] Foreign Application Priority Data

May 9, 1985 [JP] Japan .................... 60-98842

[51] Int. Cl.$^4$ .............................. C21C 5/38
[52] U.S. Cl. ..................... 266/158; 266/159
[58] Field of Search ................. 266/158, 159

[56] References Cited

U.S. PATENT DOCUMENTS 3,799,520  3/1974  Hegemann et al. ............. 266/158
4,078,777  3/1978  Mearns et al. ................. 266/158
4,596,382  6/1986  Lazcano-Navarro et al. ..... 266/158

FOREIGN PATENT DOCUMENTS 166614   9/1974  Japan .
229409  12/1974  Japan .
596806   3/1978  U.S.S.R. ..................... 266/158

Primary Examiner—L. Dewayne Rutledge
Assistant Examiner—Robert L. McDowell

[57] ABSTRACT

An apparatus for sealing the skirt of a converter waste gas recovery system is disclosed, which includes an annular flange that is mounted about the outside surface of the converter adjacent to its mouth at a point clear outside the reach of the molten slag and metal that might spill over the rim of the converter mouth during the process of blowing. An annular sealing band is provided at the lower peripheral portion of the skirt, which runs surrounding the mouth. The annular sealing band is divided into multiple arcuate segments of a whole bandage, each pivotally disposed on a horizontal pin and connected to a separate hydraulic cylinder through its axially movable piston rod. It is so designed that the segments of the annular sealing band are individually yet simultaneously swung about their respective pins by their hydraulic cylinders into abutting contact with the external periphery of the flange providing a tight leakproof seal. In the contacted surfaces of the annular sealing band and the flange, sealing is most unlikely impaired by clumps of solidified slag and metal spilled in molten state from the converter mouth as in the skirts of conventional waste gas recovery systems.

4 Claims, 4 Drawing Figures

APPARATUS FOR SEALING THE SKIRT OF A CONVERTER WASTE GAS RECOVERY SYSTEM

BACKGROUND OF THE INVENTION (1) Field of the Invention:

This invention relates to an apparatus for sealing the skirt of recovery systems which collects the valuable waste gas from an oxygen blowing converter.

(2) Description of the Prior Art:

Oxygen blowing converters generate large quantities of waste gases rich in CO content during the refining of metals by pure oxygen blowing. It is well known to collect such waste gases in the unburnt state at the exit from an oxygen blowing converter to use the CO gas contained in them for various valuable purposes. This is normally done by a waste gas recovery apparatus.

A typical recovery apparatus is illustrated schematically in FIG. 3, which is connected to a converter 1 for steel production to draw the waste gases therefrom. A lance 10 is provided for blowing pure oxygen onto the bath of molten pig iron within the converter 1. As is well known, the operation of a converter comprises the three process steps of charging, blowing, and discharging. In the blowing step, pure oxygen is blown through an oxygen lance or jet into molten metal in the converter to accomplish refining. The oxygen thus blown and carbon within the molten metal react to form a large quantity of waste gas composed principally of CO. The recovery apparatus includes a fan 6 which is rotated to create a draught that draws by suction the waste gases from the converter into a gas cooler 3.

A dust collectors 4 and 5 are provided to remove the dust contained in the gases before they are conducted into a gas holder 7.

A divergent duct branches off from the main duct at a junction point and is connected at its opposite end to a stack 8. A damper 9 is provided immediately downstream of the junction in both the main duct and the divergent duct, respectively. When the waste gases are not rich enough in CO content for efficient recovery, as in the initial and final stages of blowing, these dampers 9 are manipulated in such a manner to guide the waste gases to flow into the divergent duct. The deflected gases are then discharged into the atmosphere through the stack 8, after having being burned at the top portion thereof for complete combustion.

A recovery apparatus requires to be constructed to complete airtight structure, mainly for the following two reasons. First, since the waste gases from a converter have a more or less high content of CO, escape exposes the operator in the vicinity of the apparatus to the possible danger of intoxication. Secondly, admission of atmospheric air into the system can result in a reduction in quality of the recovered waste gas. In normal practice, to provide proper seal, a skirt 2 is mounted to enclose about the waste gas outlet where the converter 1 is connected to the gas cooler 3 of the recovery system, at which leak and entrance of atmospheric air are most likely to occur.

Since the mouth of oxygen blowing converters are rugged in the surface, the skirt 2 cannot be mounted to enclose the periphery of the converter mouth close enough to provide a physically airtight seal.

Consequently, most of those conventional skirts 2 are installed at a point some way off from the periphery of the converter leaving a largely annular air gap along the lower portion of the skirt 2. The waste gases through the mouth are drawn into the duct of the recovery apparatus by suction developed by the fan 6 which may, in operation, be adjusted to maintain a predetermined internal pressure in the gas cooler. As a consequence, admission of some amount of atmospheric air into the gas cooler through this gap is unavoidable, with a resultant reduction in CO gas content.

With the recent ever-increasing trends toward using the CO gas contained in the converter waste gases for useful applications such as the production of chemical substances, various techniques have been being developed to provide a complete airtight seal between the skirt and converter waste gas outlet for efficient CO gas recovery.

One such a development in the prior art, which might give some interesting comparison to the present invention, is illustrated in FIG. 4. Referring to the drawing, the skirt 2 is mounted about the gas cooler 3 of the recover apparatus just above the mouth of the converter 1. An annular sealing member 14 is provided below the skirt 2. The sealing member 14 is movably hinged on a horizontal pin in such a manner that, when the skirt 2 is placed into position, the sealing member 14 is brought into abutting contact with the flanged rim of the converter mouth 15. In the drawing, the numeral 11 indicates a tank of water for water sealing with a sealing plate 12 while the numeral 13 designating a hydraulic cylinder for travelling the skirt 2 in the vertical direction.

However, the flanged rim of the converter mouth tends to be covered in the surface with adhered lumps of slag and metal, the sealing member 14, when brought down into place by the descending skirt, is seated on a plane defined by the summits of such lumps leaving clevices along the bottom periphery of the member 14.

SUMMARY OF THE INVENTION

The present invention contemplates to eliminates the above-mentioned drawbacks of problems with the conventional skirts for converter waste gas recovery systems.

It is therefore a main object of the present invention to provide an apparatus capable of complete airtight seal in the skirt installed at the waste gas outlet of a converter mouth for higher CO content gas recovery.

To achieve the above and other advantages and features of the present invention, the seal is designed to surround the rim of the converter mouth at a point in its outside circumference some way down the converter mouth outlet opening where molten slag and metal are unlikely to adhere. Further, the sealing band is divided into multiple segments of a bandage, each pivotally disposed on a horizontal pin in such a way that it can be swung into abutting contact with the external periphery of the outlet rim. The outside outlet circumference with which the sealing band segments are contacted may preferably be a surface along the vertical peripheral portion of the flange provided at the converter mouth or an outside periphery of an annular seal ring mounted along the flange. In addition, each of the sealing band segments may preferably be coupled to a separate hydraulic cylinder which operates through its movable piston rod to bring the respective segment into proper pressure contact against the external outlet circumference.

BRIEF DESCRIPTION OF THE ACCOMPANYING DRAWINGS

DESCRIPTION OF THE PREFERRED EMBODIMENTS

A preferred embodiment of the present invention will be described in great detail in conjunction with the accompanying drawings.

Figure 1:
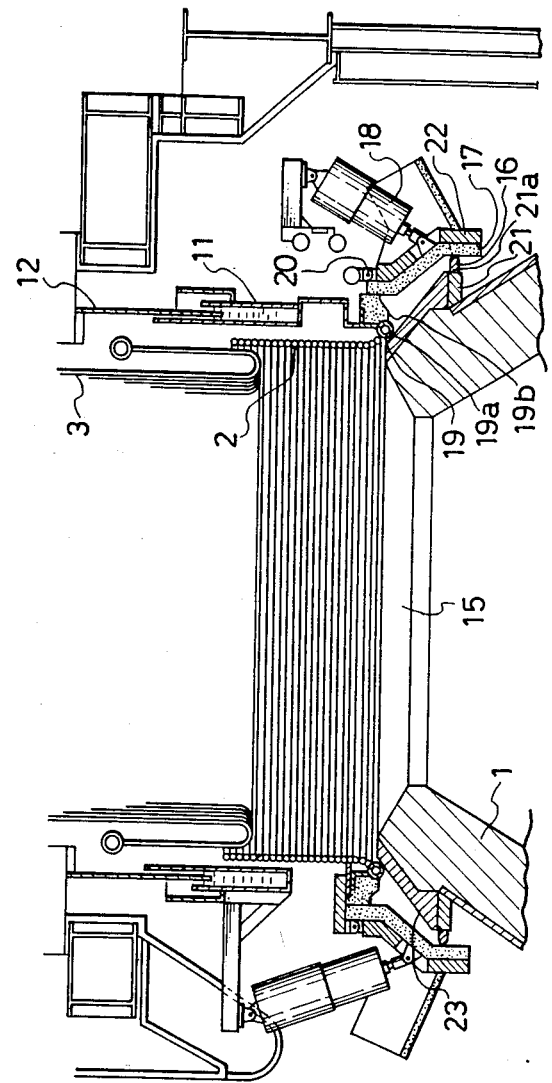
FIG. 1 is a side view of a preferred embodiment according to the present invention.

Referring to FIG. 1, a skirt 2 is installed between the converter mouth 15 of an oxygen blowing converter 1 and the water-cooled gas cooler 3 of a waste gas recovery apparatus. The converter mouth 15 has adjacent to its rim 23 a flanged portion 21, which includes an external vertical peripheral portion 21a. Also, the flanged portion 21 carries an annular seal ring 16 along its vertical peripheral portion 21a. An annular sealing band 17 is mounted at the lower portion of the skirt 2.

Figure 2:
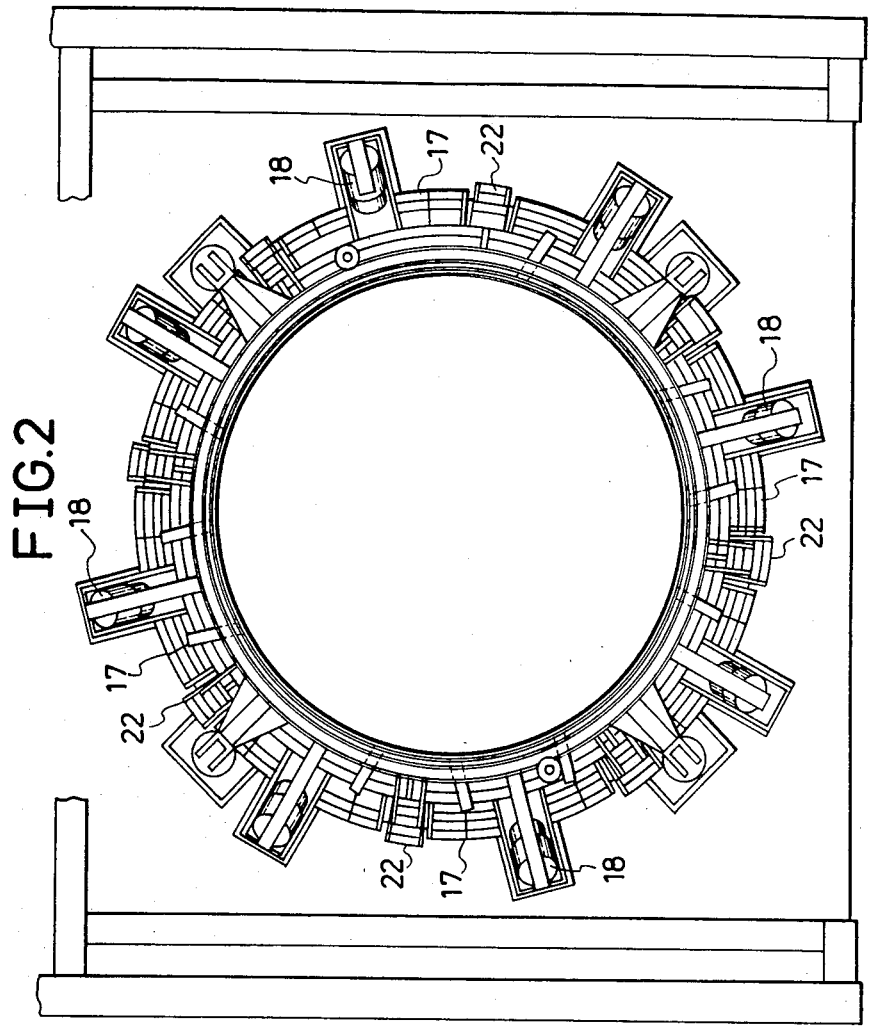
FIG. 2 is a plan view of the embodiment of FIG. 1.
Figure 3:
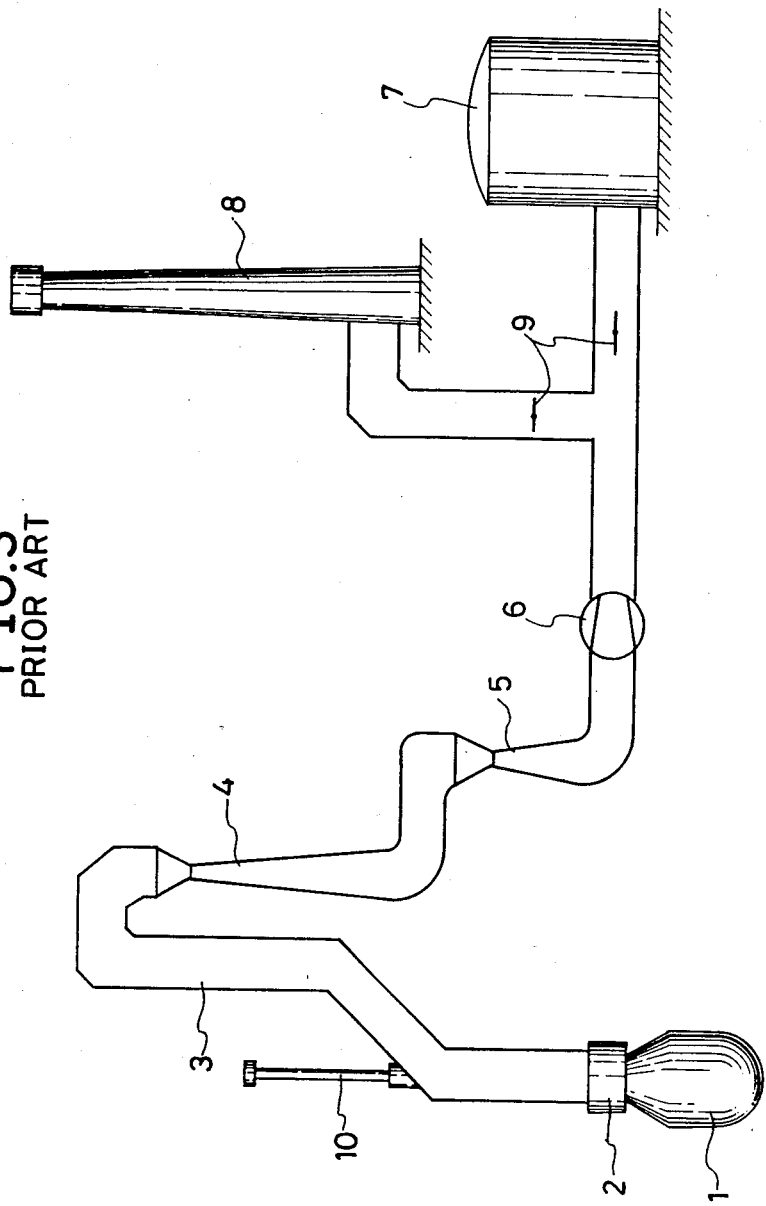
FIG. 3 is a schematic view shown the overall structure of a waste gas recovery apparatus for oxygen blowing converters.
Figure 4:
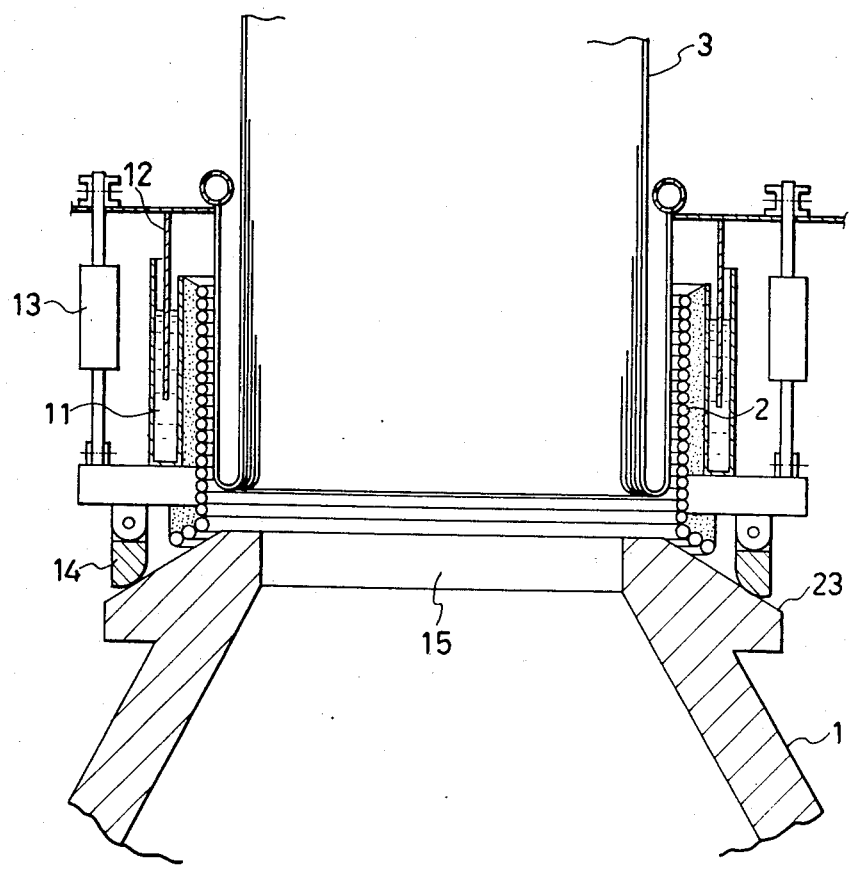
FIG. 4 is a side cross-section view of the conventional waste gas recovery apparatus, showing the seal along the bottom edge of the skirt.

Referring to FIG. 2, the sealing band 17 is circumferentially divided into multiple segments of a bandage. Each of the sealing band segments 17 is pivotally hinged on a horizontal pin 20 that is provided adjacent to the rim 23 of the converter mouth 15 in such a manner that it can be swung about the axis of the pin 20 to bring its lower end to move toward or away from the annular seal ring 16. Also, a hydraulic cylinder 18 is operatively coupled to each of the sealing band segments 17, and is actuated to move the respective sealing band segment 17 into proper pressure contact against the annular seal ring 16 ensuring desired airtight seal in the skirt 2. Bands covering 22 are provided in a gap formed between each sealing band segment 17 and are overlaid on the gap, and together with the sealing band segment can be swung as described above. The segmented sealing band 17 may be made of, as might be judged from FIG. 2, a refractory material. Alternatively, it may be of a structure that is water-cooled.

In FIG. 1, skirt 2 is provided by the panel tube and joined with annular skirt member 19 at its bottom edge, providing a coolant passage for coolant passing through the panel tube, and for preventing the contents of the converter 1, when increased in volume, from spilling over the brim of the converter mouth 15.

Annular skirt member 19 comprises first and second skirt members, and wherein the first skirt member being adapted to form one pipe, and the second skirt member being made of a refractory material shaped to conform with and mounted in contact with the first skirt member.

Also, the numeral 11 designates largely a container of water for water sealing with a sealing plate 12.

With the above-mentioned arrangement, operation of the present invention will then be described.

As the process of blowing advances, slag begins to form at the surface of the molten metal in the converter 1. When the reaction becomes further active inside the converter, it sometimes happens that the slag and metal in the molten state comes up near to or above the rim of the converter mouth 15. The annular skirt member 19 stands to prevent the molten contents from being spilled over the rim 23, when the skirt member 19 is closely abutted against the rim of the converter mouth 15. Although the skirt member 19 is originally designed and constructed to provide seal at the rim 23, deformation in the member structure, owing to high temperatures during converter operation, works against necessary leakproof sealing, allowing slight amounts of molten slag and metal from time to time, which adhere to and solidifies in the external periphery of the converter mouth 15.

However, these slight spilled amounts of the molten slag and metal are unlikely to move a long distance down the circumference of the converter mouth 15. The annular seal ring 16 is provided at a point clear out of the possible reach of the flowing spilled molten contents. Preferably, the sealing band segment 17 is built into a structure that can be water-cooled such that spilled molten slag and metal can be cooled rapidly to solidification. Thus, the surface of the annular seal 16 can be maintained smooth and clean, the sealing band segments 17 will be brought into close contact against the annular seal ring 16 by activating their respective hydraulic cylinders 18.

Also, since the skirt is sealed by the annular skirt member 19, the overall sealing effect is further enhanced.

Further, the annular seal 16 is closed by the divided segments of the sealing band 17 and the band covering 22, individually pressed by separate hydraulic cylinders, local deformations or irregularities in the sealed surface can be more effectively adjusted than by a one-piece sealing band.

In another embodiment of the present invention, the annular seal ring 16 provided along the external vertical surface 21a of the flanged portion 21 may be eliminated, where the sealing band segment 17 is contacted directly against the vertical surface 21a. This embodiment provides a simpler contsturction.

From the above, it will be seen that this invention accomplishes the aforesaid and other useful objects. While only one preferred embodiment of the present invention has been shown and described in detail, it will be obvious to those skilled in the art that various modifications may be made without departing from the spirit of the invention which is to be limited only within the scope of the appended claims.

What is claimes is:

1. An apparatus for sealing a skirt of a converter waste gas recovery system of a converter having a mouth with a rim, comprising:

an annular flange formed adjacent to the rim of the mouth of the converter and mounted just below a lower portion of said skirt, said annular flange including a vertical external surface;

an annular sealing band provided adjacent to said annular flange for abutting contact against said vertical surface of said annular flange, said annular sealing band being divided into multiple band segments, each of said sealing band segments of said annular sealing band being pivotally disposed on a separate horizontal pin in such a manner that the segment can be swung about the axis of said pin toward and away from said vertical surface of said flange; and a hydraulic cylinder system having an axially movable piston rod operatively connected to each of said sealing band segments of said annular sealing band and adapted to bring the respective segment into pressure contact against said vertical surface.

2. An apparatus as claimed in claim 1, wherein said flange carries along said vertical surface an additional annular seal ring.

3. An apparatus as claim in claim 1, comprising a band covering gaps between said sealing band segments.

4. An apparatus as claimed in any one of claims 1 to 3, wherein said skirt forms a panel of tubes and a first, annular skirt member at a bottom edge of said skirt and forming a pipe, and a second skirt member of refractory material shaped to conform with and mounted in contact with the first skirt member, the pipe providing a coolant passage for coolant passing through the panel of tubes.

* * * * *